M. SHACKELFORD.
Corn Plow and Planter.
No. 86,458.  Patented Feb. 2, 1869.
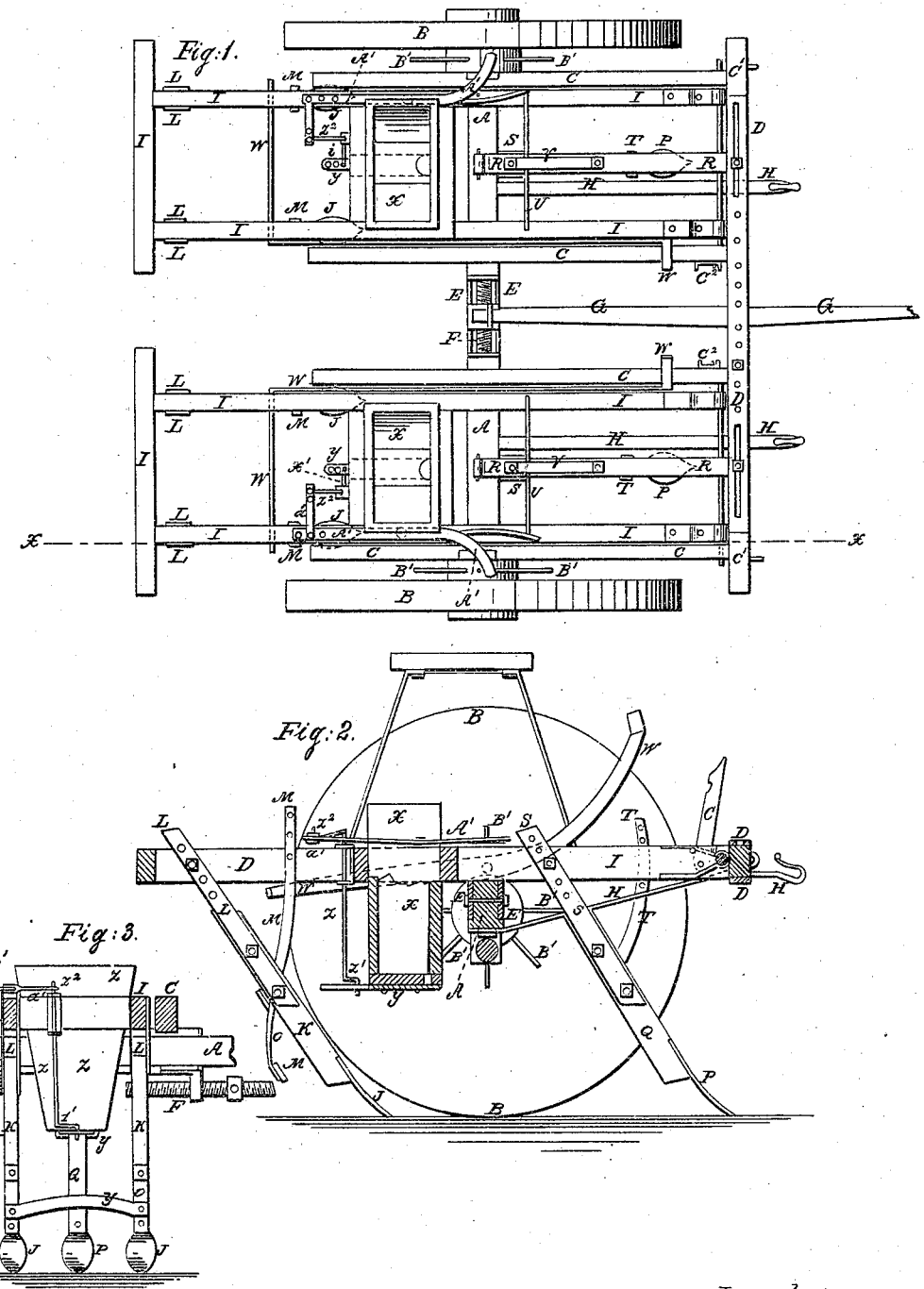

M. SHACKELFORD, OF MONTGOMERY, ALABAMA.

Letters Patent No. 86,458, dated February 2, 1869.

IMPROVEMENT IN COMBINED PLOW AND PLANTER.

The Schedule referred to in these Letters Patent and making part of the same.

*To all whom it may concern:*

Be it known that I, M. SHACKELFORD, of Montgomery, in the county of Montgomery, and State of Alabama, have invented a new and improved Combined Plow, Planter, and Cultivator; and I do hereby declare that the following is a full, clear, and exact description thereof, which will enable others skilled in the art to make and use the same, reference being had to the accompanying drawings, forming part of this specification, in which—

Figure 1 is a top or plan view of my improved machine.

Figure 2 is a vertical longitudinal detail sectional view of the same, taken through the line $x$ $x$, fig. 1.

Figure 3 is a detail sectional view of a part of the same.

Similar letters of reference indicate like parts.

My invention has for its object to furnish a simple, convenient, and effective machine, which shall be so constructed and arranged that it may be easily adjusted for use for preparing the ground, planting the seed, and cultivating the crop; and It consists in the construction and combination of the various parts, as hereinafter more fully described.

A is the axle-tree, to the axles of which the wheels B are attached in the ordinary manner, and to which the frame C is securely attached.

The forward cross-bars $c^1$ of the frame C are adjustably connected to each other by bars or straps, D, placed upon the upper and lower sides of said bars $c^1$, and adjustably secured in place by bolts passing through holes in said bars $c^1$, and through holes or slots in the bars D.

The axle-tree A is made in two parts, which are adjustably secured to each other by the bars or straps E, placed upon the front and rear sides of said parts, and adjustably secured in place by bolts, passing through holes in the said parts of the said axle-tree, and through holes or slots in the said bars or straps E, in the same manner as hereinbefore described with reference to the bars or straps D of the frame C.

The parts of the axle-tree A are also connected to each other by the right and left screw F, which passes through nuts securely attached to the said parts of the said axle-tree, and turned, to extend or contract the machine, by a lever or wrench, applied to the square middle part of said right and left screw F.

G is the tongue, which passes through guides or sockets, attached to the middle parts of the bars or straps D and E, as shown in fig. 1.

H are the draught-bars, upon the forward ends of which are formed hooks, and which are attached to the parts of the axle-tree A and frame C, as shown in fig. 1.

I are frames, the forward ends of which are pivoted to the forward part of the frame C, and which rest upon the parts of the axle-tree A.

J are the covering plows, the standards K of which are adjustably attached to the rear parts of the side bars of the frames I by the adjustable straps or bars L, and which are strengthened against the draught-strain by the adjustable braces M, as shown in fig. 2, so that the said plows may be adjusted to run at a greater or less depth, as may be desired, and so that their pitch may be adjusted as required.

N are horizontal bars, connected with the standards K, by the arms O, in such a position as to smooth off the ground over the seed in the rear of the said covering-plows J.

The bars N may be curved upon their lower edges, if desired, so as to round off the surface of the ground.

P are the furrowing-plows, which open the furrows to receive the seed, and the standards Q of which are adjustably connected with the bar or lever R, by means of the adjustable bars or straps S, and adjustable braces T, in the same manner as hereinbefore described with reference to the standards of the covering-plows, and for the same purposes.

The rear ends of the beams or levers R are pivoted or hinged to the parts of the axle-tree A, and their forward ends rest upon the bars or rods by which the frames I are pivoted to the frame C, or upon shoulders or supports, formed upon or attached to the forward part of the said frame C.

U is a cross-bar or rod, the ends of which are securely attached to the side bars of the frame I, and which passes through a long keeper, V, attached to or along a slot formed in the bar or beam R, so that the furrowing-plow may be raised from the ground by raising the frame I.

W is a foot-lever, the forward end of which extends forward into such a position that it may be reached and operated by the driver with his foot.

The lever W is pivoted to the frame C, and its rear end is bent at right angles, and passes beneath the side bar or bars of the frames I, so that the driver, by depressing the forward ends of the levers W with his feet, can raise the covering-plows from the ground, the furrowing-plows being raised from the ground at the same time, and by the same operation.

$c^2$ are catches, attached to the frame C in such positions that, when the levers W are depressed, the said catches may take hold of the said levers, and hold the plows away from the ground, for convenience in passing from place to place.

The said catches may be held forward by springs, attached to the frame C, and pressing against the said catches $c^2$.

X are the seed-boxes, which are attached to the frame I, and which have holes in their bottoms for the escape of the seed, which said holes are closed by a sliding plate, Y.

To the rear end of the plate Y, or to an arm formed upon the rear end of said plate, is pivoted the lower crank $i$ of the crank-rod Z, several holes being formed in the said plate, for the reception of the said crank, to enable the movement of said plate Y to be regulated at pleasure.

The crank-rod Z works in bearings, attached to the frame I, and upon its upper end is formed a crank, $z^2$, which is pivoted to an arm, $a'$, rigidly but adjustably attached to the end of the lever A', so as to project at right angles to said lever A'.

The lever A' is pivoted to the frame I, and its forward end is bent, so as to incline outward into such a position that it may be operated by the radial arms B' as the machine is drawn forward.

The radial arms B' are detachably attached to the inner part of the hubs of the wheels B, so that, as the wheels revolve, the said arms B' may operate the sliding plate Y to drop the seed.

By this construction, by increasing or diminishing the number of the arms B', the plate Y may be operated faster or slower, to drop the seed closer together, or further apart, as may be desired.

It should be observed that, by attaching plows of different forms to the plow-standards, and adjusting the position of said standards, the machine may be easily adjusted for the different kinds of work for which it may be required.

Having thus described my invention,

I claim as new, and desire to secure by Letters Patent—

1. Adjustably connecting the plow-standards K and Q to their supports, by means of the adjustable bars or straps L and S, and adjustable braces M and T, substantially in the manner herein shown and described. and for the purposes set forth.

2. The combination of the pivoted bar or beam R, to which the furrowing-plow is attached, with the axle-tree A, pivoted frame I, and frame C, substantially as herein shown and described, and for the purposes set forth.

3. The combination of the pivoted frame I and foot-lever W with the frame C and axle-tree A, substantially as herein shown and described, and for the purpose set forth.

4. The combination of the sliding plate Y, crank-rod Z, cranks $z^1$ $z^2$, arm $a'$, lever A', and detachable radial arms B', with each other, and with the seed-box X, frame I, and wheel B, substantially as herein shown and described, and for the purpose set forth.

M. SHACKELFORD.

Witnesses:
T. R. CARTER,
B. J. BONHAM.